United States Patent
Huang et al.

(10) Patent No.: US 10,783,352 B2
(45) Date of Patent: Sep. 22, 2020

(54) FACE RECOGNITION SYSTEM AND METHOD THEREOF

(71) Applicants: Mindtronic AI Co., Ltd., Grand Cayman (KY); Shanghai XPT Technology Limited, Shanghai (CN)

(72) Inventors: Mu-Jen Huang, Taipei (TW); Ya-Li Tai, Taoyuan (TW); Yu-Sian Jiang, Kaohsiung (TW); Shi-Yuan Huang, Taipei (TW)

(73) Assignees: Mindtronic AI Co., Ltd., Grand Cayman (KY); Shanghai XPT Technology Limited, Shanghai (CN)

( * ) Notice: Subject to any disclaimer, the term of this patent is extended or adjusted under 35 U.S.C. 154(b) by 13 days.

(21) Appl. No.: 15/935,053

(22) Filed: Mar. 25, 2018

(65) Prior Publication Data
US 2019/0138794 A1 May 9, 2019

(30) Foreign Application Priority Data

Nov. 9, 2017 (CN) .......................... 2017 1 1099567
Nov. 9, 2017 (CN) ..................... 2017 2 1487383 U
Mar. 21, 2018 (CN) .......................... 2018 1 0237040
Mar. 21, 2018 (CN) ..................... 2018 2 0387687 U

(51) Int. Cl.
  *G06K 9/00* (2006.01)
  *G06F 21/32* (2013.01)
  *G06K 9/62* (2006.01)

(52) U.S. Cl.
  CPC ......... *G06K 9/00261* (2013.01); *G06F 21/32* (2013.01); *G06K 9/00268* (2013.01); *G06K 9/00315* (2013.01); *G06K 9/6203* (2013.01); *G06K 9/00899* (2013.01)

(58) Field of Classification Search
  USPC ....................................................... 382/118
  See application file for complete search history.

(56) References Cited

U.S. PATENT DOCUMENTS

| | | | |
|---|---|---|---|
| 9,202,105 B1 * | 12/2015 | Wang | G06Q 20/4014 |
| 2006/0011399 A1 | 1/2006 | Brockway | |
| 2008/0166052 A1 | 7/2008 | Hatano | |
| 2010/0031202 A1 | 2/2010 | Morris | |
| 2013/0307875 A1 | 11/2013 | Anderson | |
| 2015/0192991 A1 | 7/2015 | Dal Mutto | |
| 2016/0057138 A1 * | 2/2016 | Hoyos | G06T 7/73 726/7 |

(Continued)

*Primary Examiner* — Stephen P Coleman
(74) *Attorney, Agent, or Firm* — Winston Hsu

(57) ABSTRACT

A face recognition system based upon a facial motion including an image capturing device, a storage device and a processing unit. The storage device stores facial information of an intended user. The facial information contains data of the intended user's facial feature and is associated with a binding operation. The image capturing device captures a facial video clip where a user makes a series of facial expressions over a time frame. The facial video clip of the user contains image frames. The processing unit extracts at least one facial feature of the user from the image frames and calculates the variation of that over the time frame. The processing unit compares the variation of the facial feature of the user with the facial information of the intended user. If the deviation between them falls within a threshold, the processing units goes on to perform the binding operating.

20 Claims, 5 Drawing Sheets

(56) References Cited

U.S. PATENT DOCUMENTS

| | | |
|---|---|---|
| 2016/0275941 A1 | 9/2016 | Bellegarda |
| 2016/0316237 A1 | 10/2016 | Couleaud |
| 2017/0061970 A1* | 3/2017 | Escott .................. G10L 17/20 |
| 2017/0083088 A1 | 3/2017 | Lannsjö |
| 2017/0142324 A1 | 5/2017 | Jost |
| 2018/0096196 A1 | 4/2018 | Gordon |

* cited by examiner

FACE RECOGNITION SYSTEM AND METHOD THEREOF

BACKGROUND OF THE INVENTION

1. Field of the Invention

The present invention relates to a face recognition system and methods of the same; more particularly to a system and methods of dynamic face recognition based on a facial motion.

2. Description of the Prior Art

In a conventional face recognition system, a static facial image of a user is based upon. When the user desires to unlock a binding device, the image capturing device in the system captures the user's facial image and compares it against the stored facial image to see if they are identical. If they match, the binding device is unlocked. The conventional face recognition system however can be problematic and unreliable. For example, the binding device may erroneously be unlocked because the apparatus mistakenly recognizes someone who looks similarly to the subject user (for instance the user's twin brother or sister), or a mere photograph of the user. Additionally, the binding device may also be accidentally unlocked simply because the user appears in front of the face recognition apparatus.

SUMMARY OF THE INVENTION

The present invention provides a face recognition system and methods thereof to strengthen the security and reliability.

A face recognition system of the present invention includes an image capturing device, a storage device and a processing unit. The storage device stores facial information of an intended user. The facial information contains data of the intended user's facial feature and is associated with a binding operation. The image capturing device captures a facial video clip where a user makes a series of facial expressions over a time frame. The facial video clip of the user contains a plurality of image frames. The processing unit connected to the image capturing device and the storage device. The processing unit extracts at least one facial feature of the user from the image frames and calculates the variation of that over the time frame. Apart from that, the processing unit compares the variation of the facial feature of the user with the facial information of the intended user. If the deviation between them falls within a threshold, the processing units goes on to perform the binding operating.

A method of face recognition of the present invention includes: storing a facial information of an intended user, wherein the facial information contains data of the intended user's facial feature and is associated with a binding operation; capturing a facial video clip where a user makes a series of facial expressions over a time frame, wherein the facial video clip of the user contains a plurality of image frames; extracting at least one facial feature of the user from the image frames; calculating a variation on the user's facial feature over the time frame; comparing the variation of the user's facial feature with the facial information of the intended user; and performing the binding operation if the deviation between the variation and the facial information falls within a threshold.

A method of two-step face recognition of the present invention includes: verifying whether a user is an intended user by comparing at least one facial feature of the user and the intended user; comparing a variation on the user's facial feature over a time frame with a source variation on the intended user's facial feature over the time frame; and performing a binding operation if the deviation of the variation and the source variation falls within a threshold.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
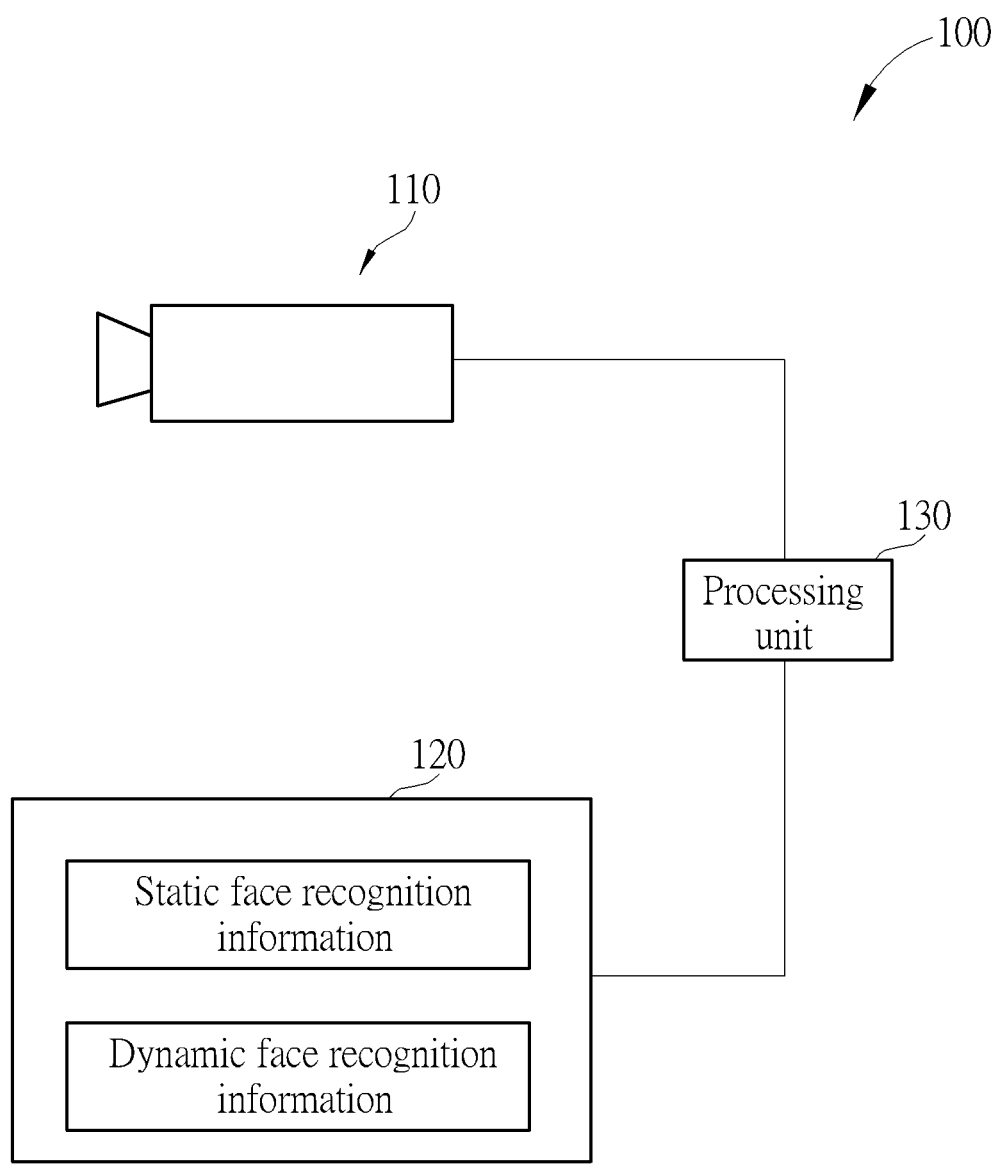
FIG. 1 is a schematic diagram showing a face recognition system of the present invention.

FIG. 1 demonstrates the face recognition system 100 of the present invention which provides a dynamic face recognition based on a facial motion rather than a still image. As shown in FIG. 1, the face recognition system 100 includes an image capturing device 110, a storage device 120 and a processing unit 130. The image capturing device 110 is configured to capture images of a user. The storage device 120 is configured to store a facial information of an intended user. The processing unit 130 is connected, electrically or wirelessly, to the image capturing device 110 and the storage device 120. Skilled persons in the art should understand that it is not a requirement under the present invention to integrate the image capturing device 110, the storage device 120 and the processing unit 130 in the same box. The invention can also be achieved by any alternative means so long as the desired functions described herein are achieved. For instance, the storage device 120 and the processing unit 130 may be cloud-based services where these devices are wirelessly connected to each other.

The face recognition system 100 of the present invention is dynamic because a user's facial motion rather than a still facial image is based upon. As shown in FIG. 1, the storage device 120 contains facial information of an intended user. The facial information is associated one or more binding service/function, and it may include a static facial information and a dynamic facial information. The static facial information contains data of the intended user's facial feature(s) in a static state; while the dynamic facial information contains data of the intended user's facial feature(s) in a dynamic state. More specifically, the dynamic facial information may be obtained by recording a source video clip where the intended user makes a facial motion containing a series of facial expressions over a time frame. The source video clip contains a plurality of source image frames of the intended user. The processing unit 130 extracts at least one facial feature(s) of the intended user from the source facial image frames and calculates a variation on the intended user's the facial feature(s) over the time frame. The data of the facial feature(s) and the variation collectively may be stored as the intended user's facial information.

Additionally, when a user attempts to unleash the binding service/function, the image capturing device 110 captures a video clip of the user. Similarly, in the video clip the user makes a facial motion containing a series of facial expression over a time frame. The video clip may also contain a plurality of image frames. The processing unit 130 extracts at least one facial feature(s) from the image frames and calculate a variation on the user's facial feature (s) over the time frame. The variation of facial feature(s) is compared with the facial information of the intended user. If the deviation between them is within a threshold, the processing unit 130 goes on to perform the binding service/function. There are many ways known to the skilled persons to calculate the deviation, for example, without limitation, the time dynamic warping (DTW) technique. As aforementioned, the binding service may be to unlock an electronic device or run an application program, etc.

In one embodiment of the present invention, the face recognition system 100 may perform a two-step, static and dynamic, face recognition. More precisely, the face recognition system 100 may verify if the user is the intended user before considering the performance of the binding service/function. Specifically, the face recognition system 100 firstly verifies if a user in front of the image capturing device 110 is the intended user. If so, the face recognition system. 100 then proceeds to figure out whether to perform an associated service/function, such as unlock an electronic device or control an electronic device to perform a predefined function, etc. It should be noted that under the scope of the present invention, the first step of face recognition is made based on a still facial image of the user, while a dynamic facial motion is resorted to by the second step of the face recognition. In the two-step face recognition, it is only when the user is verified and the user makes approximately the same facial expressions that an associated and binding service/function is performed. Thus, the overall reliability and security of the face recognition system 100 are enhanced.

Figure 2:
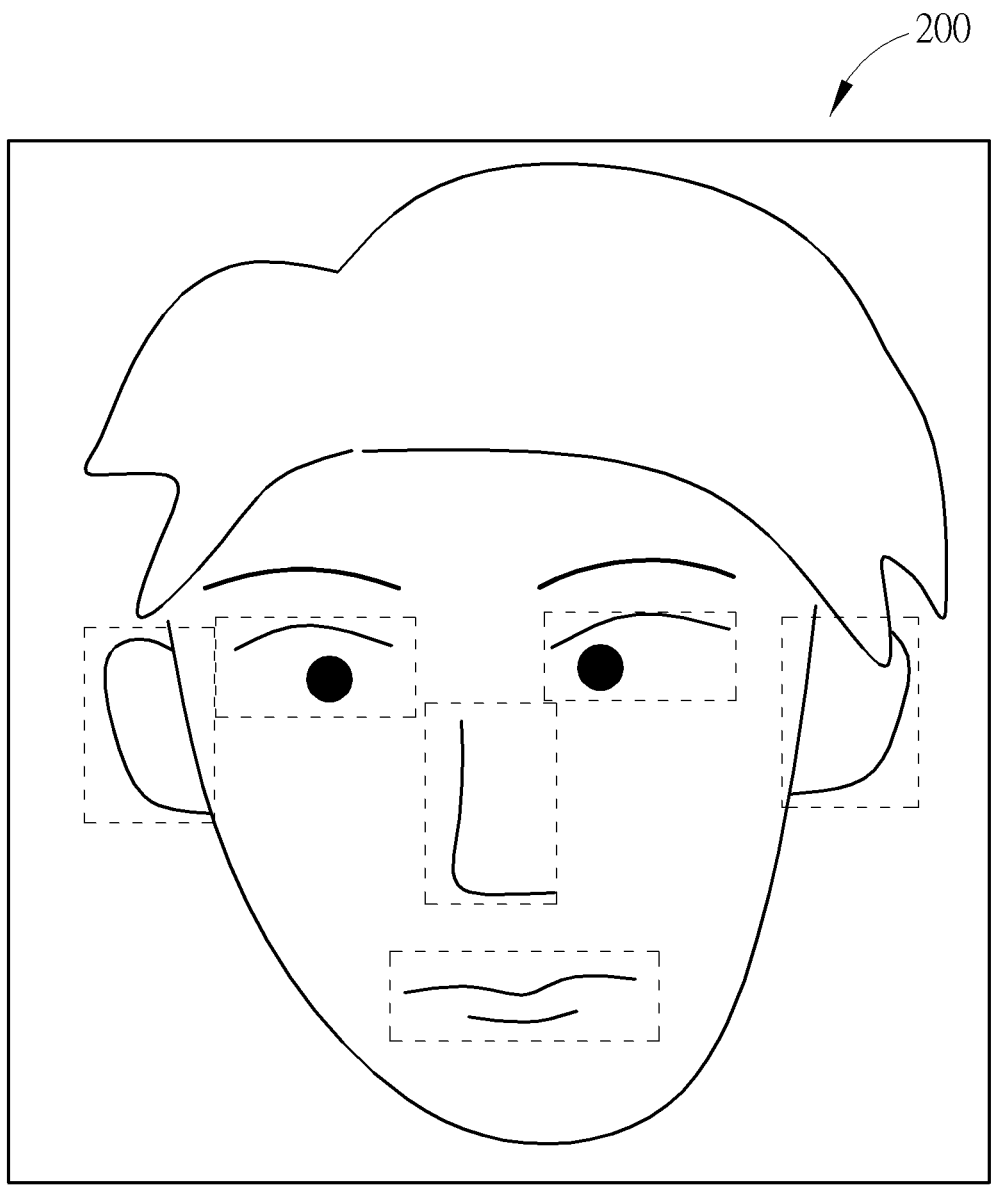
FIG. 2 is a schematic diagram showing a face recognition process of the present invention based upon still images.

FIG. 2 illustrates how a face recognition of the present invention based upon still images works. The face recognition may be performed once or, in another embodiment, periodically. With also reference to FIG. 1, first of all, the processing unit 130 obtains a user's static facial image 200. In one embodiment, the image 200 may be captured by the image capturing device 110 retrieved from one of the image frame of the video clip captured by the image capturing device 110. Once obtained, the processing unit 130 extracts at least one facial feature(s) of the user from the image 200. The facial feature (s) may be the shapes, the positions or the relative positions of, for example, the user's eyes, ears, mouth, nose or face contours, etc. obtained either in the two-dimension or the three-dimension domain depending on whether the static facial image 200 is a 2D or 3D image. Further, the processing unit 130 compares the data of the user's facial features against the facial information of the intended user stored in the storage device 120. It should be noted that the processing unit 130 may obtain at least one facial feature(s) of the intended user in the same way beforehand. If they match (or approximately match), the processing unit 130 verifies that the user is the intended user and goes on to perform a dynamic face recognition.

It should be noted that the facial feature (s) of the (intended) user may be obtained from sources other than the (source) image frames of the (source) video clip. For instance, it may be extracted from a still image separately and independently captured by the image capturing device 110. Further, the facial feature(s) may not be a single feature but a multiple and/or a combination of facial landmarks and/or key points. The above is a mere example and should not to any extent becomes a limitation to the present invention.

Figure 3:
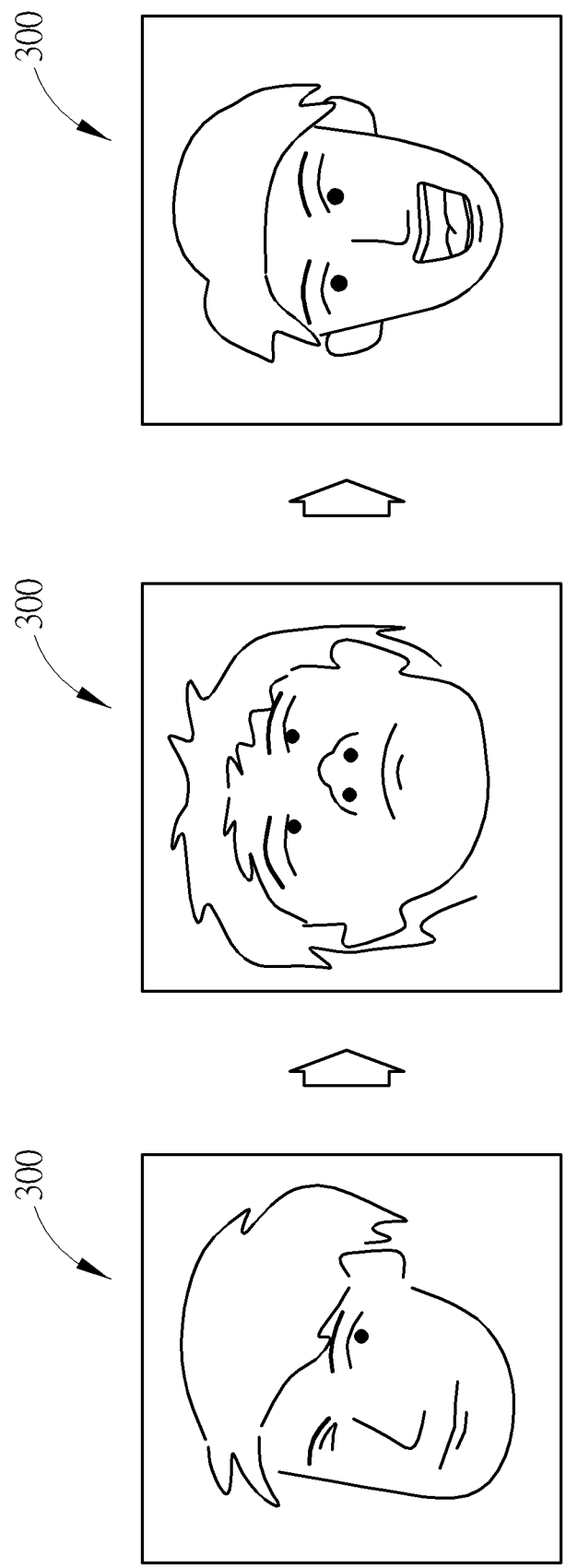
FIG. 3 is a schematic diagram showing a face recognition process of the present invention based upon facial motions.

FIG. 3 illustrates how a face recognition in accordance with the present invention where a dynamic facial motion is based upon works. It should be noted that the dynamic face recognition is a standalone process and does not necessarily have to work in conjunction with the static face recognition for the present invention to work. To begin with, the intended user may record a source video clip where he/she makes a series of facial expressions (such as blinking, snout-up, and mouth-open) over a time frame constituting a unique key to unleash one or more binding service/function. The source video clip contains a plurality of source image frames. The processing unit extracts at least one facial feature(s) of the intended user may be in the same way as discussed in the previous section. Alternatively, if the static face recognition is conducted beforehand, the fact recognition system 100 may simply take the result from the static face recognition. The processing unit 130 then calculates a source variation on the intended user's facial feature over the time frame. The source variation may be the changes on the shape and/or the position of the intended user's eyes, nose and mouth; and the calculation may be made either in the two-dimension or three-dimension domain. The data of the intended user's facial features (i.e. static facial information) as well as the source variation (i.e. dynamic facial information) are stored in the storage device 120.

When a user attempts to unleash the binding service/function by making (approximately) the same facial motion over a time frame containing a series of facial expression including blinking, snout-up, and mouth-open, the image capturing device 110 captures the facial motion as a video clip. The video clip includes a plurality of image frames, collectively called a dynamic facial image 300 as shown in FIG. 3. The processing unit 130 extracts at least one facial features of the user may be in the same way as stated in the discussion of FIG. 2. Alternatively, if the static face recognition is conducted beforehand, the face recognition system 100 may simply take the result. The processing unit 130 then calculates a variation of the user's the facial feature(s) over time frame. The variation may be the changes on the shape and/or the position of the user's eyes, nose and lip; and the calculation may be made either in the two-dimension or three-dimension domain. For instance, the processing unit 130 may first identify the shapes and/or positions of the user's eyes, lips and/or nose on the first image frame of the dynamic facial image 300, and then calculates the variation(s) on the shape and/or (exact and/or relative) position of the eyes, lips and/or nose based on the rest image frames. The processing unit 130 compares the variation of the user's facial feature(s) with the intended user's facial information stored in the storage device 120 to see if they (approximately) match. If the deviation between them falls within a threshold, the processing unit 130 goes on to perform the binding service/function, such as unlock an electronic device or control to perform a predefined function. The technique of dynamic time warping (DTW) may be applied for the determination of the deviation.

The face recognition system 100 of the present invention provides a more secure and reliable way to unleash a binding service/function. Under the present invention, it will not be easy for anyone who looks like the intended user to enable the binding service. Moreover, even the intended user will not accidentally enable the binding service unless a particular facial motion is made.

As discussed, since the user's facial feature can be extracted from the image frames of the video clip, the user's identity can be verified as well. Thus, although in the present invention the dynamic face recognition serves to determine the performance of a binding service/function, it should be noted that it can also be used to the verification of identity merely. Moreover, it is not always required to verify the user beforehand for a binding service/function to be performed. So long as the variation of the user's facial feature matches the source variation of the intended user's facial feature, it will be sufficient to unleash the binding service/function. In another embodiment, the overall recognition rate is decided by combining the results of the static and the dynamic face recognition with different weightings given to them.

FIG. 3 is a mere example showing how a user may make a series of facial expressions (i.e. together they are a facial motion) to constitute a unique key to unleash the performance of a binding service/function. There may be other combinations of facial expressions to form the key. For instance, the user may make facial expressions such as being wide-eyed, sticking the tongue out, and duck-faced, etc. Various combinations of facial expressions constitute various keys. The intended user may, depending on the preference and the desired complexity, choose one or some of the facial motions to enable the performance of one or several binding services/functions. The intended user may also exaggerate facial motions, for instance, by making lip expressions of silent talk, to increase the complexity of facial features. In the present invention, the intended user may also move and/or rotate his/her head to enhance the variation(s) of facial feature(s) and therefore increase the security of false identification.

The recognition method adopted in the face recognition system 100 may be any image processing techniques and/or algorithms known to the skilled persons in the field so long as the they are able to fulfill the propose of the present invention. Additionally, more than one techniques may be applied to the face recognition system 100. The techniques may include, for instance and without limitation, machine learning, computer vision, image processing and/or video processing. In one embodiment, one or more facial feature(s) may be extracted over a time frame. The variation on the facial feature(s) is observed over the time frame and is compared against the facial information stored in the storage device 120 to see if the deviation is within a threshold. The facial information may include the date of the intended user's one or more facial feature(s) that is able to distinguish the intended user from others. The facial feature may be a feature descriptor, facial landmarks (such as nose, eyes, lip, eyebrows, chin, cheek, etc.), or the combination of the two. The feature descriptor may include, without limitation, edges, histogram of gradient (HOG), local binary patterns (LBP), or key-points.

Figure 4:
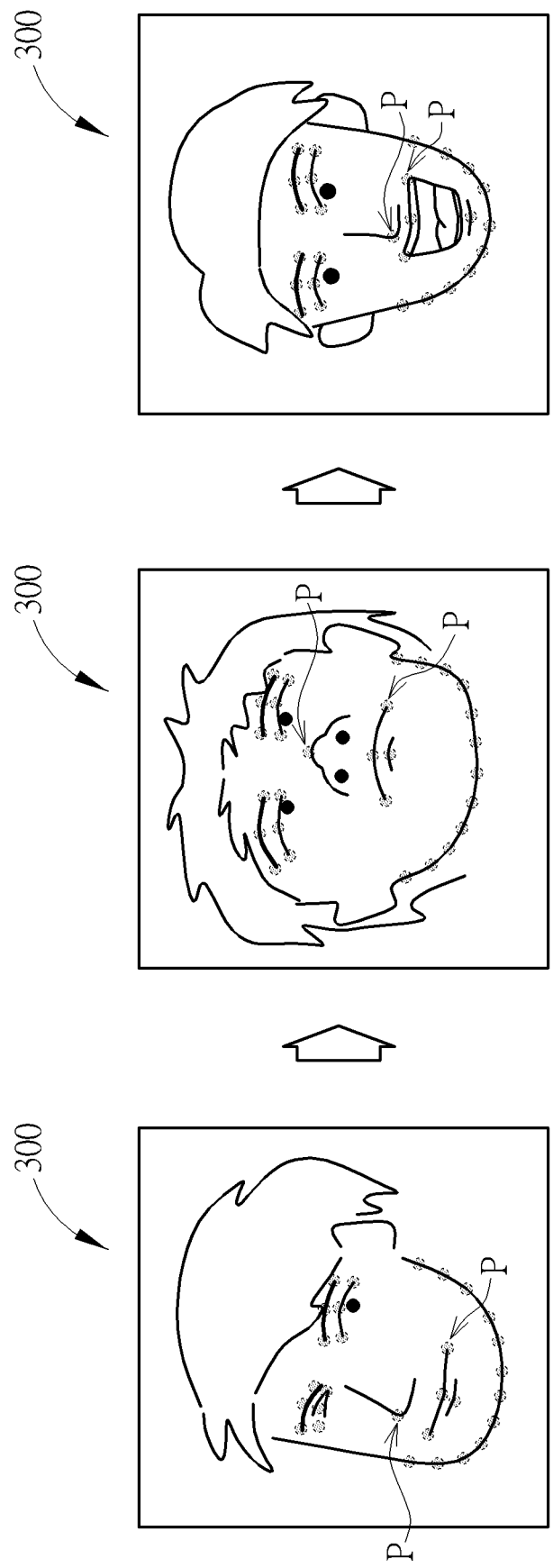
FIG. 4 is a schematic diagram showing a face recognition process of the present invention according to facial landmarks of the user.

FIG. 4 illustrates the dynamic facial image 300 where the user's lip and nose are chosen as the facial landmarks P. As shown, the vector variation of the facial landmarks P in position (either in the two-dimension or three-dimension domain) over a time frame can be determined and compared with the facial information of the intended user. It should be noted that the facial information should also contain the vector variation on the same facial landmarks P collected from the intended user. To perform the face recognition according to the present invention, the processing unit 130 compares the image 300 where both the facial landmarks P and the variation over the time frame are obtained with the intended user's facial information to see if the deviation is within a threshold.

As mentioned above, in one embodiment, the facial landmarks P may be obtained from one of the image frames of the image 300; alternatively, they may be obtained from a still image separately and independently captured by the image capturing device 110. Once the facial landmarks P are identified, the face recognition system 100 calculates the vector variation of the user's facial landmarks P over the time frame. The variation is compared with the facial information of the intended user to determine whether the binding service associated with the facial motion should be performed. Although only two facial landmarks P, nose and lip, are selected in the present embodiment as shown in FIG. 4, one may adopt more facial landmarks to conduct the face recognition in accordance with the present invention. The more facial landmarks are considered, the more processing time the system will require but the more accuracy the recognition can achieve.

There are various ways to determine if the variation of the user's facial features is identical to the default facial information. A technique called dynamic time warping (DTW) may be applied to determine the deviation. Taking a smile for example, one may tag 20 key points surrounding the intended user's mouth and record the positional changes on the key points over the intended user's smile. The positional changes altogether composes a smile track function—SFtn. When a user attempts to unlock a binding service by smiling, the face recognition system 100 spots approximately the same key points from the user and records the positional changes over the user's smile. The user's smile track function is defined as Ftn. The face recognition system 100 applies the DTW technique to calculate the deviations between SFtn and Ftn; a DTW score is therefore obtained. If the DTW is within a predefined threshold, it means the user passes the face recognition and the binding service can be performed. The above example considers positional changes as the basis to obtain the track functions. Nevertheless, persons skilled in the art should understand that other alternatives such as angle changes, distances, etc. can be used to achieve the same purpose. Additionally, different weightings may be given to different key points. If the confidence level of a particular key point rises, the weighting given to the particular key point is increased as well.

In another embodiment, a machine learning algorithm may embed one or more facial features of the user into a vector in a multiple dimension. The vector is compared with the intended user's facial information in the same way as previously disclosed. The machine learning algorithm may include, without limitation, neural network, principal component analysis (PCA), and auto encoder, etc.

In the present invention, the image capturing device 110 may capture three-dimensional facial images of a user by, for instance without limitation, an infrared transmitter, a distance measuring device, an optical zoom device, an image processing method or any similar techniques.

Figure 5:
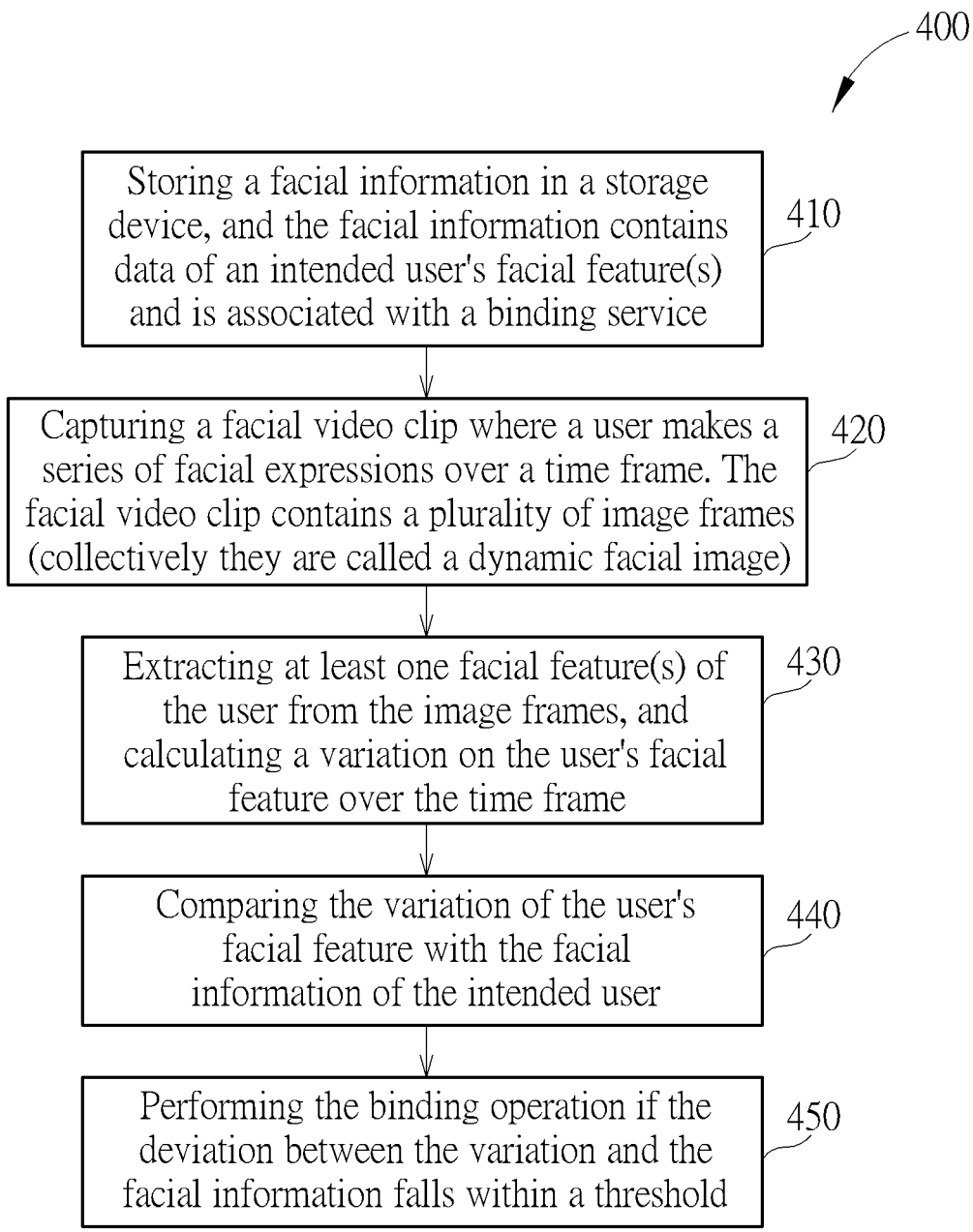
FIG. 5 is a schematic diagram showing a method of face recognition of the present invention.

FIG. 5 illustrates the method of face recognition 400 in accordance with the present invention. The steps are as follows:

Step 410: storing a facial information in a storage device, and the facial information contains data of an intended user's facial feature(s) and is associated with a binding service;

Step 420: capturing a facial video clip where a user makes a series of facial expressions over a time frame. The facial video clip contains a plurality of image frames (collectively they are called a dynamic facial image).

Step 430: extracting at least one facial feature (s) of the user from the image frames, and calculating a variation on the user's facial feature over the time frame;

Step 440: comparing the variation of the user's facial feature with the facial information of the intended user; and Step 450: performing the binding operation if the deviation between the variation and the facial information falls within a threshold.

Aside from the above steps, the method of the face recognition process according to the present invention may also include the following steps: i) pre-recording a source video clip where the intended user makes a series of facial expressions over a time frame as a unique key to unleash the binding service, wherein the source video clip contains a plurality of source image frames; ii) extracting at least one facial feature of the intended user from the source image frames; and iii) calculating a source variation on the intended user's facial feature over the time frame, wherein the intended user's facial feature data and the variation constitute the intended user's facial information.

In one embodiment, the method of face recognition may further include verifying whether the user is the intended user beforehand by comparing the extracted facial feature(s) with the facial information. Moreover, the facial feature may be obtained independently and separately from the (intended) user's static facial image.

The present invention provides a face recognition based on dynamic facial motions rather than still facial images solely. The face recognition according to the present invention is dynamic because facial motions can be randomly combined by various facial expressions. A combined facial motion forms a unique key to unleash one or more binding service/function. Thus, the invention can not only reduce the chance of false identification by a twin brother/sister or a mere photo of the intended user, but also prevent any binding service from being performed accidently even by the intended user. The overall reliability and security of the face recognition system can therefore be achieved by the implementation of the present invention.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A face recognition system, comprising:
a storage device configured to store facial information of an intended user, wherein the facial information contains data of the intended user's facial feature and a combination of multiple facial expressions associated with a binding operation, the combination of facial expressions is defined by the intended user, and the combination of facial expressions constitutes a key to unleash the performance of a binding function;
an image capturing device configured to capture a facial video clip of a user, wherein the facial video clip of the user contains a plurality of image frames; and
a processing unit connected to the image capturing device and the storage device, wherein the processing unit is configured to:
extract at least one facial feature of the user from the facial video clip and calculate a variation of the at least one facial feature of the user over a time frame of the facial video clip;
compare the variation of the facial feature of the user with various combinations of facial expressions stored in the storage device, and perform the binding operation if a deviation between the variation and one of the combinations of facial expressions falls within a threshold;
wherein the binding operation includes various binding functions, a first binding function is performed when the deviation between the variation and a first combination of facial expressions falls within the threshold, and a second binding function is performed when the deviation between the variation and a second combination of facial expressions falls within the threshold.

2. The face recognition system of claim 1, wherein the processing unit is configured to apply the technique of dynamic time warping (DWT) to determine if the deviation is within the threshold.

3. The face recognition system of claim 1, wherein the processing unit is configured to extract at least one facial feature of the user from a facial image.

4. The face recognition system of claim 1, wherein the binding operation includes operations to unlock an electronic device or to run an application program.

5. The face recognition system of claim 1, wherein the image capturing device is further configured to pre-record a source video clip where the intended user makes the multiple facial expressions, wherein the source video clip contains a plurality of source image frames of the intended user, and wherein the processing unit is configured to extract at least one facial feature of the intended user from the source video clip, calculate a source variation on the intended user's facial feature over the time frame, compare the variation of the facial feature of the user with the source variation on the intended user's facial feature, and perform one of the binding functions of the binding operation when the deviation between the variation and the source variation falls within the threshold.

6. The face recognition system of claim 5, wherein the processing unit is configured to firstly verify if the user is the intended user by comparing the facial feature of the user with that of the intended user, and determine whether to perform the binding operation by comparing the variation and the source variation only when the user is verified.

7. A method of face recognition, comprising:
storing a facial information of an intended user, wherein the facial information contains data of the intended user's facial feature and a combination of multiple facial expressions associated with a binding operation, the combination of facial expressions is defined by the intended user, and the combination of facial expressions constitutes a key to unleash the performance of a binding function;
capturing a facial video clip of a user, wherein the facial video clip of the user contains a plurality of image frames;
extracting at least one facial feature of the user from the facial video clip;
calculating a variation on the user's facial feature over a time frame of the facial video clip;
comparing the variation of the user's facial feature with various combinations of facial expressions stored in the storage device; and
performing the binding operation if a deviation between the variation and one of the combinations of facial expressions falls within a threshold;
wherein the binding operation includes various binding functions, a first binding function is performed when the deviation between the variation and a first combination of facial expressions falls within the threshold, and a second binding function is performed when the deviation between the variation and a second combination of facial expressions falls within the threshold.

8. The method of claim 7, further comprising applying the dynamic time warping (DWT) technique to determine the deviation.

9. The method of claim 7, wherein at least one of the user's facial feature is extracted from a facial image of the user.

10. The method of claim 7, wherein the binding operation includes operations to unlock an electronic device or to run an application program.

11. The method of claim 7, further comprising:
pre-recording a source video clip where the intended user makes the multiple facial expressions, wherein the source video clip contains a plurality of source image frames;
extracting at least one facial feature of the intended user from the source video clip;
calculating a source variation on the intended user's facial feature over the time frame; and
comparing the variation of the facial feature of the user with the source variation on the intended user's facial feature;
wherein one of the binding functions of the binding operation is performed when the deviation between the variation and the source variation falls within the threshold.

12. The method of claim 11, further comprising verifying whether the user is the intended user by comparing the facial feature of the user with that of the intended user; and determining whether to perform the binding operation by comparing the variation and the source variation only when the user is verified.

13. A method of two-step face recognition, comprising:
verifying whether a user is an intended user by comparing at least one facial feature of the user and at least one facial feature of the intended user;
comparing a variation on the user's facial feature over a time frame with various source variations on the intended user's facial feature over the time frame, wherein each of the source variations is calculated from each of various combinations of multiple facial expressions, the combinations of facial expressions are defined by the intended user, and each of the combinations of facial expressions constitutes a key to unleash the performance of a binding function; and
performing a binding operation if a deviation of the variation and one of the source variations falls within a threshold;
wherein the binding operation includes various binding functions, a first binding function is performed when the deviation between the variation and a first source variation calculated from a first combination of facial expressions falls within the threshold, and a second binding function is performed when the deviation between the variation and a second source variation calculated from a second combination of facial expressions falls within the threshold.

14. The method of claim 13, further comprising applying dynamic time warping (DTW) technique to determine the deviation.

15. The method of claim 13, wherein the binding operation includes operations to unlock an electronic device or run an application program.

16. The method of claim 13, further comprising:
recording a video clip of a user, wherein the video clip contains a plurality of image frames;
extracting at least one facial feature of the user from the video clip; and
calculating the variation on the user's facial feature over the time frame.

17. The method of claim 16, wherein at least one of the user's facial feature is obtained from a facial image of the user.

18. The method of claim 13, further comprising:
pre-recording a source video clip where the intended user makes the multiple facial expressions, wherein the source video clip contains a plurality of source image frames;
extracting at least one facial feature of the intended user from the source video clip; and
calculating the source variation on the intended user's facial feature over the time frame.

19. The method of claim 18, further comprising:
storing data of the intended user's facial feature as well as the source variation, wherein the combinations of multiple facial expressions are associated with the binding operation.

20. The method of claim 18, wherein the intended user's facial feature is obtained from a facial image of the intended user.

* * * * *